United States Patent
Xu et al.

(10) Patent No.: US 11,999,626 B1
(45) Date of Patent: Jun. 4, 2024

(54) LEACHING METHOD OF SCHEELITE

(71) Applicant: Chongyi Zhangyuan Tungsten Co., Ltd., Ganzhou (CN)

(72) Inventors: Guozuan Xu, Ganzhou (CN); Daibin Zhang, Ganzhou (CN); Chenglong Huang, Ganzhou (CN); Quan Peng, Ganzhou (CN); Xin Zhang, Ganzhou (CN); Qiumin Yang, Ganzhou (CN)

(73) Assignee: CHONGYI ZHANGYUAN TUNGSTEN CO., LTD., Ganzhou (CN)

( * ) Notice: Subject to any disclaimer, the term of this patent is extended or adjusted under 35 U.S.C. 154(b) by 0 days.

(21) Appl. No.: 18/373,975

(22) Filed: Sep. 28, 2023

(30) Foreign Application Priority Data

Apr. 14, 2023 (CN) .......................... 202310396767.X

(51) Int. Cl.
| | | |
|---|---|---|
| *C01C 1/28* | (2006.01) | |
| *C01G 41/00* | (2006.01) | |
| *C22B 3/06* | (2006.01) | |
| *C22B 3/08* | (2006.01) | |
| *C22B 3/10* | (2006.01) | |
| *C22B 3/44* | (2006.01) | |
| *C22B 3/22* | (2006.01) | |

(52) U.S. Cl.
CPC .............. *C01C 1/28* (2013.01); *C01G 41/00* (2013.01); *C22B 3/06* (2013.01); *C22B 3/08* (2013.01); *C22B 3/10* (2013.01); *C22B 3/22* (2013.01); *C22B 3/44* (2013.01)

(58) Field of Classification Search
CPC .. C01C 1/28; C01G 41/00; C22B 3/06; C22B 3/08; C22B 3/10; C22B 3/22; C22B 3/44

USPC .............. 435/352, 409, 658.5; 423/352, 409, 423/658.5
See application file for complete search history.

(56) References Cited

U.S. PATENT DOCUMENTS 8,771,617 B2 * 7/2014 Zhao ..................... C22B 3/06
423/55

FOREIGN PATENT DOCUMENTS

| CN | 106282608 A | * | 1/2017 |
| CN | 108642276 A | * | 10/2018 |
| WO | WO 2012083583 A1 | * | 6/2012 |

OTHER PUBLICATIONS

Gong et al., Sequential extraction of tungsten from scheelite through roasting and alkaline leaching, (2019), Minerals Engineering, 132, pp. 238-234.*

(Continued)

*Primary Examiner* — Fred Prince

(57) ABSTRACT

The present disclosure relates to the field of tungsten smelting, and in particular to a leaching method of scheelite, and provides a new technology that scheelite is leached in low temperature with a mixture acid of sulfuric acid and hydrochloric acid or nitric acid and hydrochloric acid, calcium is precipitated incompletely, and then the acid leaching solution is regenerated and closed-circuit recycled is provided. The new technology is able to leach scheelite sufficiently in low temperature so as to improve the recovery rate of tungstate and decrease the requirement of equipment. As well, the inner wall of the reaction kettle, the heating pipe and the temperature measuring device are made of steel lined tetrafluoro material which has high acid corrosion resistance and is able to deal with scheelite with high fluorine, resists the corrosion of HF.

10 Claims, 1 Drawing Sheet

(56) References Cited

OTHER PUBLICATIONS

Martins et al., Sequential extraction of tungsten from scheelite through roasting and alkaline leaching, (2003), Hydrometallurgy, 70, pp. 131-141.*

Liu et al., Complex Leaching Process of Scheelite In Hydrochloric and Phosphoric Solutions, (2016), JOM, vol. 68, No. 9, pp. 2455-2462.*

Xuin et al., Leaching of Scheelite By Hydrochloric Acid in the Presence of Phosphate (1986), Hydrometallurgy, 16, pp. 27-40.*

Machine-generated English translation of CN106282608, generated on Nov. 14, 2023.*

Machine-generated English translation of CN108642276, generated on Nov. 14, 2023.*

Machine-generated English translation of WO 2012/083583, generated on Nov. 14, 2023.*

Notice of Allowance from CNIPA dated May 22, 2023.

Allowed Claims in the Notice of Allowance from CNIPA dated May 22, 2023.

* cited by examiner

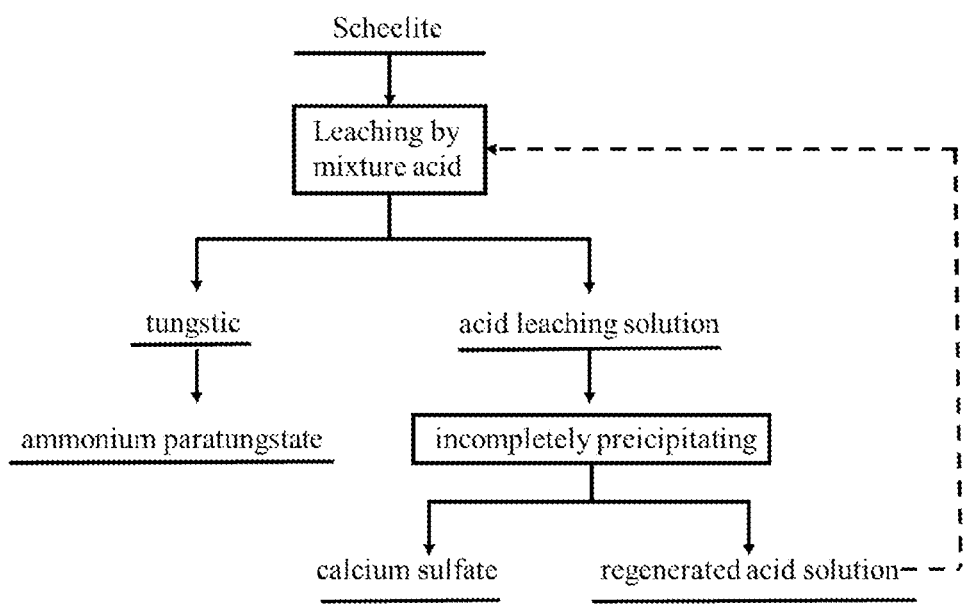

LEACHING METHOD OF SCHEELITE

CROSS-REFERENCE TO RELATED APPLICATIONS

This application claims priority to Chinese Patent Application No. 202310396767.X with a filing date of Apr. 14, 2023. The content of the aforementioned application, including any intervening amendments thereto, is incorporated herein by reference.

TECHNICAL FIELD

The present disclosure relates to the field of tungsten smelting, and in particular to a leaching method of scheelite.

BACKGROUND ART

Tungsten is a strategic mineral resource and plays a very important role in the national economy and national defense industry. With the continuous mining in recent decades, the occurrence structure of tungsten ore has changed significantly, and the resource structure has changed from wolframite to scheelite. In the tungsten smelting process, the alkali decomposition process of tungsten concentrate is widely used in the tungsten industry due to its stable process, adaptability to various complex mines, and high recovery rate of tungsten. However, tungsten smelting slag which made by the alkali decomposition process of tungsten concentrate was defined to hazardous waste in 2016, at present, the national environmental protection tends to strictly control the discharge of non-ferrous metal smelting wastewater and encourages enterprises to adopt advanced technology and equipment to reduce wastewater discharge or achieve zero discharge of wastewater. Therefore, how to dispose of scheelite with low cost, low pollution and low wastewater is the focus of the tungsten industry and has very important practical significance.

According to the above situation, researchers in the industry have proposed to use hydrochloric acid to decompose tungsten concentrate to prepare solid tungstic acid and waste acid solution, ammonium tungstate solution was obtained after that tungsten acid was dissolved in ammonia, and then magnesium salt was used to remove phosphorus, arsenic, silicon, etc. Impurities, the obtained pure ammonium tungstate solution can be evaporated and crystallized to produce ammonium paratungstate products. This process has the advantages of short process flow, less wastewater generation, and low production cost, and also the tungsten slag was not defined to hazardous waste. However, this process requires high reaction temperature. At this time, the test for the sealing and corrosion resistance of the reactor is huge, which is likely to cause large acid mist, pollute the surrounding environment, and easily corrode and damage the equipment. Especially when dealing with fluorine-containing tungsten ore, it is easy to produce Hydrogen fluoride is more corrosive to equipment; in addition, the acid leaching solution produced by this process is difficult to comprehensively recycle, and the direct neutralization treatment with lime will not only waste a lot of acid resources, but also generate a certain cost of lime neutralization, and will also generate a large amount of wastewater treatment Sludge is difficult to handle; if the acid leaching solution is directly returned to decompose scheelite, it will lead to problems such as incomplete decomposition.

SUMMARY OF THE DISCLOSURE

In order to solve the problems of the above-mentioned background art, it is a main object of the present disclosure to provide a leaching method of scheelite, so as to leach scheelite sufficiently in a low temperature and improve the recovery rate of tungstate to 99.5% or more.

In order to achieve the above object, the present disclosure provides the following technical solutions.

A leaching method of scheelite, comprises the following steps:

S1, leaching scheelite:
putting a certain amount of scheelite in a reaction kettle, adding hydrochloric acid according to the liquid-solid ratio of hydrochloric acid to scheelite of 2-4:1 mL/g, and 0.3-1% sulfuric acid or nitric acid by volume of the hydrochloric acid, and then stirring, leaching, cooling and filtering to obtain tungstic acid and acid leaching solution;

S2, regenerating acid leaching solution and using it in the manner of closed-circuit circulation:
adding 0.1-2.5% sulfuric acid by volume of the acid leaching solution to the acid leaching solution for incomplete precipitation of calcium, and cooling to the room temperature after reaction, then filtering and washing to obtain calcium sulfate and regenerated acid solution, returning the regenerated acid solution to the step of leaching scheelite, in which hydrochloric acid is added to meet the liquid-solid ratio of 2-4:1 mL/g, and other procedures are same to step S1.

As a preferred technical solution of the present disclosure, the above-mentioned method further comprises, S3, removing the impurity of ammonium tungstate solution:
dissolving ammonia according to the liquid-solid ratio of aqueous ammonia to tungstic acid of 3-5:1 mL/g, and filtering to obtain ammonia dissolution slag and ammonium tungstate solution, adding ammonium sulfide, magnesium sulfate and copper sulfate in turn to the ammonium tungstate solution, filtering to obtain pure ammonium tungstate solution after sufficient reaction, and then carrying out evaporating crystallization to obtain ammonium paratungstate product.

As a preferred technical solution of the present disclosure, the concentration of the hydrochloric acid in the step S1 is 17-31 wt %.

As a preferred technical solution of the present disclosure, the concentration of the sulfuric acid and the nitric acid in the step S1 are 98 wt % and 96-98 wt % respectively.

As a preferred technical solution of the present disclosure, the inner wall of the reaction kettle in the step S1 is made of steel lined tetrafluoro material, a heating pipe and a temperature measuring device are installed in the reaction kettle, which are also made of steel lined tetrafluoro material.

As a preferred technical solution of the present disclosure, the leaching temperature in the step S1 is 60-95° C., the leaching time in the step S1 is 1.5-6 h.

As a preferred technical solution of the present disclosure, the concentration of the sulfuric acid in the step S2 is 98 wt %.

As a preferred technical solution of the present disclosure, the reaction time in the step S2 is 25-35 min.

As a preferred technical solution of the present disclosure, the concentration of the aqueous ammonia in the step S3 is 3-6 wt %.

As a preferred technical solution of the present disclosure, the temperature of dissolving ammonia in the step S3 is room temperature and the time of dissolving ammonia in the step S3 is 1-2 h The present disclosure has the following outstanding characteristics and remarkable effects.

In the present disclosure, a new technology of which scheelite is leached in low temperature with a mixture acid of sulfuric acid and hydrochloric acid or nitric acid and hydrochloric acid, calcium is precipitated incompletely, and then the acid leaching solution is regenerated and closed-circuit recycled is provided. The new technology is able to leach scheelite sufficiently in low temperature so as to improve the recovery rate of tungstate and decrease the requirement of equipment. As well, the inner wall of the reaction kettle, the heating pipe and the temperature measuring device are made of steel lined tetrafluoro material which has high acid corrosion resistance and is able to deal with scheelite with high fluorine, resists the corrosion of HF, and further improves the corrosion resistance of equipment. Moreover, the production cost is lowered significantly by using the acid leaching solution in the manner of closed-circuit circulation.

BRIEF DESCRIPTION OF THE DRAWINGS

In order to illustrate the technical solutions in the examples of the present disclosure or the prior art clearly, the drawings which are needed to describe the examples or the prior art are introduced briefly. Obviously, the following description of drawings is only part of the present disclosure, for the skilled person in the art, other drawings would be obtained according to the structure shown in these drawings without creative efforts.

FIG. 1 is a procedure diagram of the present disclosure.

The realization of the purpose, functional characteristics and advantages are further described in conjunction with the examples and the accompanying drawings.

DETAILED DESCRIPTION OF THE DISCLOSURE

The technical solutions in the examples of the disclosure will be described clearly and completely. Obviously, the described examples are only part of the examples of the disclosure, rather than all of the examples. Based on the examples in the disclosure, all other examples obtained by a person skilled in the art without involving any inventive effort are within the scope of protection of the disclosure.

Due to that the short produce process of ammonium paratungstate comprising acid decomposition, ammonia dissolution, purification and impurity removal, and evaporation crystallization has strict requirements on reaction temperature, corrosion resistance and sealing of the reaction kettle, and results in heavy acid mist, environmental pollution and easy corrosion of equipment. Especially in dealing with scheelite with fluorine, it's hard to find material with HF corrosion. And also, it's very hard to treat with acid leaching solution produced by above-mentioned process. Neutralization by lime results in not only large waste of resource and high cost, but also heavy wastewater and mud which are hard to be treated. When the acid leaching solution is returned directly to the step of scheelite leach, the slag with 20 wt % or more of $WO_3$ will be obtained after the alkali dissolution of tungstic acid process. The present disclosure adopts a new technology of which scheelite is leached in low temperature with a mixture acid of sulfuric acid and hydrochloric acid or nitric acid and hydrochloric acid, calcium is precipitated incompletely, and then the acid leaching solution is regenerated and closed-circuit recycled. That is, the dense tungstic acid film structure of the reaction product is destroyed so as to increase the contact area between scheelite and hydrochloric acid and the reaction rate. At the same time, due to the high concentration of sulfuric acid or nitric acid, the acid concentration of reaction system can be always kept at high level during the process, which leads to more sufficient leaching of scheelite. Based on the important discovery that calcium sulfate can partly dissolve in the mixture solution of hydrochloric acid and calcium chloride, a new technology of incomplete precipitation is provided to treat acid leaching solution to obtain regenerated acid solution, and the regenerated acid solution can be recycled to leach scheelite efficiently by strictly controlling the concentration of sulfate ions. The technology significantly reduces the leaching temperature, make it possible to leach scheelite sufficiently in low temperature so as to improve the recovery rate of tungstate and decrease the requirement of equipment, and also successfully adopts the closed-circuit circulation of acid leaching solution to make waste profitable, and reduce the discharge of waste liquid and the production cost. And also, the production cost can be further reduced by recycling calcium sulfate to the dephophorus treatment of sodium tungstate.

According to one aspect of the present discourse, a technical solution is provided as follows:

With reference to FIG. 1, a leaching method of scheelite, comprises the following steps:

S1, leaching scheelite:
putting a certain amount of scheelite in a reaction kettle, adding hydrochloric acid according to the liquid-solid ratio of hydrochloric acid to scheelite of 2-4:1 mL/g, and 0.3-1% sulfuric acid or nitric acid by volume of the hydrochloric acid, and then stirring, leaching, cooling and filtering to obtain tungstic acid and acid leaching solution; the concentration of the hydrochloric acid is 17-31 wt %, the concentration of the sulfuric acid is 98 wt % and the concentration of the nitric acid is 96-98 wt %. The dense tungstic acid film structure of the reaction product is destroyed so as to increase the contact area between scheelite and hydrochloric acid and the reaction rate. At the same time, due to the high concentration of sulfuric acid or nitric acid, the acid concentration of reaction system can be always kept at high level during the process, which leads to more sufficient leaching of scheelite. Alkali dissolution slag comprising 0.2-1 wt % $WO_3$ can be obtained by alkali dissolving the tungstic acid. Specifically, the liquid-solid ratio of hydrochloric acid to scheelite can be, for example but not limited to, any one of 2:1 mL/g, 2.2:1 mL/g, 2.5:1 mL/g, 2.7:1 mL/g, 3:1 mL/g, 3.3:1 mL/g, 3.5:1 mL/g, 3.8:1 mL/g, 4:1 mL/g or the range formed by any two of above-mentioned figures. Counting by the volume of hydrochloric acid, the content of sulfuric acid or nitric acid can be, for example but not limited to, any one of 0.3%, 0.4%, 0.5%, 0.6%, 0.7%, 0.8%, 0.9%, 1.0% or the range formed by any two of above-mentioned figures. The concentration of the hydrochloric acid can be, for example but not limited to, any one of 17%, 18%, 19%, 20%, 21%, 22%, 23%, 24%, 25%, 26%, 27%, 28%, 29%, 30%, 31% or the range formed by any two of above-mentioned figures. The concentration of the nitric acid can be, for example but not limited to, any one of 96%, 96.5%, 97%, 97.5%, 98% or the range formed by any two of above-mentioned figures.

S2, regenerating acid leaching solution and using it in the manner of closed-circuit circulation:
adding 0.1-2.5% sulfuric acid by volume of the acid leaching solution to the acid leaching solution for incomplete precipitation of calcium, and cooling to the room temperature after reaction, then filtering and washing to obtain calcium sulfate and regenerated acid solution, returning the regenerated acid solution to the step of leaching scheelite, in which hydrochloric acid is added to meet the liquid-solid ratio of 2-4:1 mL/g, and other procedures are same to step S1. The secondary tungstic acid obtained by above procedure is alkali dissolved to obtain the alkali dissolution slag comprising 0.2-1.5 wt % $WO_3$. Based on the important discovery that calcium sulfate can partly dissolve in the mixture solution of hydrochloric acid and calcium chloride, a new technology of incomplete precipitation is provided to treat acid leaching solution to obtain regenerated acid solution, and the regenerated acid solution can be recycled to leach scheelite efficiently by strictly controlling the concentration of sulfate ions. Specifically, counting by the volume, the ratio of sulfuric acid to acid leaching solution can be, for example but not limited to, any one of 0.1%, 0.3%, 0.5%, 0.7%, 1.0%, 1.2%, 1.5%, 1.8%, 2.0%, 2.2%, 2.5% or the range formed by any two of above-mentioned figures.

Further, the above-mentioned method comprises, S3, removing the impurity of ammonium tungstate solution: dissolving ammonia according to the liquid-solid ratio of aqueous ammonia to tungstic acid of 3-5:1 mL/g, and filtering to obtain ammonia dissolution slag and ammonium tungstate solution, adding ammonium sulfide, magnesium sulfate and copper sulfate in turn to the ammonium tungstate solution, filtering to obtain pure ammonium tungstate solution after sufficient reaction, and then carrying out evaporating crystallization to obtain ammonium paratungstate product. Specifically, the liquid-solid ratio of aqueous ammonia to tungstic acid can be, for example but not limited to, any one of 3:1 mL/g, 3.3:1 mL/g, 3.5:1 mL/g, 3.7:1 mL/g, 4:1 mL/g, 4.2:1 mL/g, 4.5:1 mL/g, 4.8:1 mL/g, 5:1 mL/g or the range formed by any two of above-mentioned figures. The concentration of the aqueous ammonia can be, for example but not limited to, any one of 3%, 3.5%, 4%, 4.5%, 5%, 5.5%, 6% or the range formed by any two of above-mentioned figures. The time of ammonia dissolution can be, for example but not limited to, any one of 1 h, 1 h 10 min, 1 h 20 min, 1 h 30 min, 1 h 40 min, 1 h 50 min, 2 h or the range formed by any two of above-mentioned figures.

Further, the inner wall of the reaction kettle in the step S1 is made of steel lined tetrafluoro material, a heating pipe and a temperature measuring device are installed in the reaction kettle, which are also made of steel lined tetrafluoro material. The inner wall of the reaction kettle, the heating pipe and the temperature measuring device are made of steel lined tetrafluoro material which has acid corrosion resistance in high temperature, and HF corrosion resistance.

Further, the leaching temperature in the step S1 is 60-95° C., the leaching time in the step S1 is 1.5-6 h. The present disclosure makes it possible to leach scheelite sufficiently in low temperature so as to improve the recovery rate of tungstate and decrease the requirement of equipment. Specifically, the leaching temperature can be, for example but not limited to, any one of 60° C., 65° C., 70° C., 75° C., 80° C., 85° C., 90° C., 95° C., or the range formed by any two of above-mentioned figures. The leaching time can be, for example but not limited to, any one of 1.5 h, 2.0 h, 2.5 h, 3.0 h, 3.5 h, 4.0 h, 4.5 h, 5.0 h, 5.5 h, 6.0 h, or the range formed by any two of above-mentioned figures.

Further, the concentration of the sulfuric acid in the step S2 are 98 wt %, and the reaction time in the step S2 is 25-35 min Specifically, the reaction time can be, for example but not limited to, any one of 25 min, 26 min, 27 min, 28 min, 29 min, 30 min, 31 min, 32 min, 33 min, 34 min, 35 min, or the range formed by any two of above-mentioned figures.

The technical solutions are further described in conjunction with the examples.

The reaction kettle, the heating pipe and the temperature measuring device which are made of steel lined tetrafluoro material are adopted in following examples and comparative examples to treat some scheelite produced in China, of which the content is mainly as follows:

| ingredients | $WO_3$ | Fe | $SiO_2$ | $K_2O$ | Ca | others |
|---|---|---|---|---|---|---|
| Content/wt % | 55 | 1.7 | 10 | 0.64 | 17.5 | 15.16 |

Example 1

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 3.2 mL sulfuric acid with the concentration of 98 wt % being added, the temperature and time were set to 95° C. and 3.0 h respectively during leaching process, and then the solution was cooled to obtain 130 g dry tungstic acid and 360 mL acid leaching solution. The alkali dissolution slag comprising 0.22 wt % WO 3 was obtained by alkali dissolving part of the tungstic acid.

S2, regeneration and closed-circuit circulation of acid leaching solution:

9 mL sulfuric acid with the concentration of 98 wt % was added to 360 mL the acid leaching solution for incomplete precipitation of calcium, wherein the incomplete precipitation time was 30 min, the solution was cooled to room temperature to obtain 31 g calcium sulfate dihydrate and 305 mL regenerated acid solution, and then 200 g scheelite, 305 mL regenerated acid solution, 95 mL hydrochloric acid with the concentration of 31 wt % and 3.2 mL sulfuric acid with the concentration of 98 wt % were put in the reaction kettle in turn, the solution was stirred and leached, wherein the temperature and time were set to 95° C. and 3.0 h respectively during leaching process, and then the solution was cooled to obtain 131 g dry tungstic acid and 355 mL acid leaching solution. The alkali dissolution slag comprising 0.26 wt % WO 3 was obtained by alkali dissolving part of the tungstic acid.

S3, impurity removal of ammonium tungstate solution:

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Example 2

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 2.5 mL sulfuric acid with the concentration of 98 wt % being added, the temperature and time were set to 95° C. and 3.0 h respectively during leaching process, and then the solution was cooled to obtain 130 g dry tungstic acid and 358 mL acid leaching solution. The alkali dissolution slag comprising 0.51 wt % WO3 was obtained by alkali dissolving part of the tungstic acid.

S2, regeneration and closed-circuit circulation of acid leaching solution;

5.4 mL sulfuric acid with the concentration of 98 wt % was added to 358 mL the acid leaching solution for incomplete precipitation of calcium, wherein the incomplete precipitation time was 30 min, the solution was cooled to room temperature to obtain 18 g calcium sulfate dihydrate and 311 mL regenerated acid solution, and then 200 g scheelite, 311 mL regenerated acid solution, 89 mL hydrochloric acid with the concentration of 31 wt % and 2.5 mL sulfuric acid with the concentration of 98 wt % were put in the reaction kettle in turn, the solution was stirred and leached, wherein the temperature and time were set to 95° C. and 3.0 h respectively during leaching process, and then the solution was cooled to obtain 131 g dry tungstic acid and 358 mL acid leaching solution. The alkali dissolution slag comprising 1.21 wt % WO3 was obtained by alkali dissolving part of the tungstic acid.

S3, impurity removal of ammonium tungstate solution;

Ammonia dissolution was carried out according to the liquid-solid ratio of aqueous ammonia to tungstic acid of 3:1 mL/g, wherein the concentration of the aqueous ammonia was 6 wt %, the temperature and time were set to room temperature and 1 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Example 3

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 3.2 mL sulfuric acid with the concentration of 96 wt % being added, the temperature and time were set to 95° C. and 3.0 h respectively during leaching process, and then the solution was cooled to obtain 131 g dry tungstic acid and 358 mL acid leaching solution. The alkali dissolution slag comprising 0.21 wt % WO3 was obtained by alkali dissolving part of the tungstic acid.

S2, regeneration and closed-circuit circulation of acid leaching solution;

9 mL sulfuric acid with the concentration of 98 wt % was added to 358 mL the acid leaching solution for incomplete precipitation of calcium, wherein the incomplete precipitation time was 30 min, the solution was cooled to room temperature to obtain 30 g calcium sulfate dihydrate and 303 mL regenerated acid solution, and then 200 g scheelite, 303 mL regenerated acid solution, 97 mL hydrochloric acid with the concentration of 31 wt % and 3.2 mL sulfuric acid with the concentration of 96 wt % were put in the reaction kettle in turn, the solution was stirred and leached, wherein the temperature and time were set to 95° C. and 3.0 h respectively during leaching process, and then the solution was cooled to obtain 130 g dry tungstic acid and 359 mL acid leaching solution. The alkali dissolution slag comprising 0.27 wt % WO3 was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Example 4

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 2.5 mL sulfuric acid with the concentration of 98 wt % being added, the temperature and time were set to 95° C. and 3.0 h respectively during leaching process, and then the solution was cooled to obtain 130 g dry tungstic acid and 360 mL acid leaching solution. The alkali dissolution slag comprising 0.47 wt % WO3 was obtained by alkali dissolving part of the tungstic acid.

S2, regeneration and closed-circuit circulation of acid leaching solution;

5.4 mL sulfuric acid with the concentration of 98 wt % was added to 360 mL the acid leaching solution for incomplete precipitation of calcium, wherein the incomplete precipitation time was 30 min, the solution was cooled to room temperature to obtain 20 g calcium sulfate dihydrate and 308 mL regenerated acid solution, and then 200 g scheelite, 308 mL regenerated acid solution, 92 mL hydrochloric acid with the concentration of 31 wt % and 2.5 mL sulfuric acid with the concentration of 98 wt % were put in the reaction kettle in turn, the solution was stirred and leached, wherein the temperature and time were set to 95° C. and 3.0 h respectively during leaching process, and then the solution was cooled to obtain 131 g dry tungstic acid and 357 mL acid leaching solution. The alkali dissolution slag comprising 0.86 wt % WO3 was obtained by alkali dissolving part of the tungstic acid.

S3, impurity removal of ammonium tungstate solution;

Ammonia dissolution was carried out according to the liquid-solid ratio of aqueous ammonia to tungstic acid of 3:1 mL/g, wherein the concentration of the aqueous ammonia was 6 wt %, the temperature and time were set to room temperature and 1 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Comparative Example 1

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 6.4 mL sulfuric acid with the concentration of 98 wt % being added, the temperature and time were set to 95° C. and 3.0 h respectively during leaching process, and then the solution was cooled to obtain 133 g dry tungstic acid and 362 mL acid leaching solution. The alkali dissolution slag comprising 2.69 wt % $WO_3$ was obtained by alkali dissolving part of the tungstic acid.

S2, regeneration and closed-circuit circulation of acid leaching solution;

11 mL sulfuric acid with the concentration of 98 wt % was added to 362 mL the acid leaching solution for incomplete precipitation of calcium, wherein the incomplete precipitation time was 30 min, the solution was cooled to room temperature to obtain 38 g calcium sulfate dihydrate and 299 mL regenerated acid solution, and then 200 g scheelite, 299 mL regenerated acid solution, 101 mL hydrochloric acid with the concentration of 31 wt % and 3.2 mL sulfuric acid with the concentration of 98 wt % were put in the reaction kettle in turn, the solution was stirred and leached, wherein the temperature and time were set to 95° C. and 3.0 h respectively during leaching process, and then the solution was cooled to obtain 132 g dry tungstic acid and 356 mL acid leaching solution. The alkali dissolution slag comprising 0.25 wt % $WO_3$ was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 3 wt %, the temperature and time were set to room temperature and 2 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Comparative Example 2

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached after 3.2 mL sulfuric acid with the concentration of 98 wt % being added, the temperature and time were set to 75° C. and 3.0 h respectively during leaching process, and then the solution was cooled to obtain 130 g dry tungstic acid and 360 mL acid leaching solution. The alkali dissolution slag comprising 0.24 wt % $WO_3$ was obtained by alkali dissolving part of the tungstic acid.

S2, regeneration and closed-circuit circulation of acid leaching solution;

28 mL sulfuric acid with the concentration of 98 wt % was added to 360 mL the acid leaching solution for incomplete precipitation of calcium, wherein the incomplete precipitation time was 30 min, the solution was cooled to room temperature to obtain 43 g calcium sulfate dihydrate and 285 mL regenerated acid solution, and then 200 g scheelite, 285 mL regenerated acid solution, 115 mL hydrochloric acid with the concentration of 31 wt % were put in the reaction kettle in turn, the solution was stirred and leached, wherein the temperature and time were set to 75° C. and 3.0 h respectively during leaching process, and then the solution was cooled to obtain 150 g dry tungstic acid and 350 mL acid leaching solution. The alkali dissolution slag comprising 26.8 wt % $WO_3$ was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Comparative Example 3

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached, the temperature and time were set to 95° C. and 3.0 h respectively during leaching process, and then the solution was cooled to obtain 133 g dry tungstic acid and 360 mL acid leaching solution. The alkali dissolution slag comprising 1.53 wt % $WO_3$ was obtained by alkali dissolving part of the tungstic acid.

S2, regeneration and closed-circuit circulation of acid leaching solution;

9 mL sulfuric acid with the concentration of 98 wt % was added to 360 mL the acid leaching solution for incomplete precipitation of calcium, wherein the incomplete precipitation time was 30 min, the solution was cooled to room temperature to obtain 30.5 g calcium sulfate dihydrate and 311 mL regenerated acid solution, and then 200 g scheelite, 311 mL regenerated acid solution, 89 mL hydrochloric acid with the concentration of 31 wt % and 2.5 mL sulfuric acid with the concentration of 98 wt % were put in the reaction kettle in turn, the solution was stirred and leached, wherein the temperature and time were set to 95° C. and 3.0 h respectively during leaching process, and then the solution was cooled to obtain 129 g dry tungstic acid and 360 mL acid leaching solution. The alkali dissolution slag comprising 0.68 wt % WO 3 was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Comparative Example 4

A leaching method of scheelite, comprises the following steps:

S1, scheelite leaching:

200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached, the temperature and time were set to 75° C. and 3.0 h respectively during leaching process, and then the solution was cooled to obtain 128 g dry tungstic acid and 353 mL acid leaching solution. The alkali dissolution slag comprising 2.47 wt % $WO_3$ was obtained by alkali dissolving part of the tungstic acid.

S2, regeneration and closed-circuit circulation of acid leaching solution;

18 mL sulfuric acid with the concentration of 98 wt % was added to 353 mL the acid leaching solution for incomplete precipitation of calcium, wherein the incomplete precipitation time was 30 min, the solution was cooled to room temperature to obtain 59 g calcium sulfate dihydrate and 291 mL regenerated acid solution, and then 200 g scheelite, 291 mL regenerated acid solution, 109 mL hydrochloric acid with the concentration of 31 wt % were put in the reaction kettle in turn, the solution was stirred and leached, wherein the temperature and time were set to 75° C. and 3.0 h respectively during leaching process, and then the solution was cooled to obtain 140 g dry tungstic acid and 355 mL acid leaching solution. The alkali dissolution slag comprising 5.89 wt % $WO_3$ was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

Comparative Example 5

A leaching method of scheelite, comprises the following steps:

S1, scheelite leaching 200 g scheelite was put in a reaction kettle, 400 mL hydrochloric acid with the concentration of 31 wt % was added according to the liquid-solid ratio of hydrochloric acid to scheelite of 2:1 mL/g, the solution was stirred and leached, the temperature and time were set to 75° C. and 3.0 h respectively during leaching process, and then the solution was cooled to obtain 128 g dry tungstic acid and 353 mL acid leaching solution. The alkali dissolution slag comprising 2.48 wt % $WO_3$ was obtained by alkali dissolving part of the tungstic acid.

S2, 200 g Scheelite, 353 mL Acid Leaching Solution, 47 mL Hydrochloric Acid with the concentration of 31 wt % were put in the reaction kettle in turn, the solution was stirred and leached, wherein the temperature and time were set to 75° C. and 3.0 h respectively during leaching process, and then the solution was cooled to obtain 152 g dry tungstic acid and 341 mL acid leaching solution. The alkali dissolution slag comprising 21.4 wt % WO 3 was obtained by alkali dissolving part of the tungstic acid.

S3, impurity removal of ammonium tungstate solution;

Ammonia dissolution was carried out according to the liquid-solid ratio of aqueous ammonia to tungstic acid of 4:1 mL/g, wherein the concentration of the aqueous ammonia was 5 wt %, the temperature and time were set to room temperature and 1.5 h respectively during the ammonia dissolution procedure. The solution was filtered to obtain ammonia dissolution slag and ammonium tungstate solution, and then the ammonium sulfide, magnesium sulfate and copper sulfate were added to the solution in turn, and the solution was filtered to obtain pure ammonium tungstate solution after sufficient reaction, the evaporating crystallization was carried out to obtain ammonium paratungstate product.

The present disclosure provides a new technology that scheelite is leached in low temperature with a mixture acid of sulfuric acid and hydrochloric acid or nitric acid and hydrochloric acid, calcium is precipitated incompletely, and then the acid leaching solution is regenerated and closed-circuit recycled is provided. The new technology is able to leach scheelite sufficiently in low temperature so as to improve the recovery rate of tungstate and decrease the requirement of equipment. As well, the inner wall of the reaction kettle, the heating pipe and the temperature measuring device are made of steel lined tetrafluoro material which has high acid corrosion resistance and is able to deal with scheelite with high fluorine, resists the corrosion of HF, and further improves the corrosion resistance of equipment. Moreover, the production cost is lowered significantly by using the acid leaching solution in the manner of closed-circuit circulation.

The described examples are only preferred examples of the present disclosure, and it should be noted that various alterations and improvements may be made wherein by those of ordinary skill in the art without departing from the principle of the present disclosure and should also fall within the scope of protection of the present disclosure.

What is claimed is:

1. A leaching method of scheelite, wherein the method comprises the following steps:

S1, leaching scheelite:

putting a certain amount of scheelite in a reaction kettle, adding hydrochloric acid according to a liquid-solid ratio of hydrochloric acid to scheelite of 2-4:1 mL/g, and 0.3-1% sulfuric acid or nitric acid by volume of the hydrochloric acid, and then stirring, leaching, cooling and filtering to obtain tungstic acid and acid leaching solution;

S2, regenerating acid leaching solution and using the regenerated acid leaching solution in closed-circuit circulation:

adding 0.1-2.5% sulfuric acid by volume of the acid leaching solution to the acid leaching solution for incomplete precipitation of calcium, and cooling to room temperature after reaction, then filtering and washing to obtain calcium sulfate and regenerated acid solution, returning the regenerated acid solution to the step of leaching scheelite, in which hydrochloric acid is added to meet the liquid-solid ratio of 2-4:1 mL/g.

2. The leaching method of scheelite according to claim 1, wherein the method further comprises S3, removing an impurity of ammonium tungstate solution:

dissolving ammonia according to a liquid-solid ratio of aqueous ammonia to tungstic acid of 3-5:1 mL/g, and filtering to obtain ammonia dissolution slag and ammonium tungstate solution, adding ammonium sulfide, magnesium sulfate and copper sulfate in turn to the ammonium tungstate solution, filtering to obtain pure ammonium tungstate solution after sufficient reaction, and then carrying out evaporating crystallization to obtain ammonium paratungstate product.

3. The leaching method of scheelite according to claim 1, wherein a concentration of the hydrochloric acid in the step S1 is 17-31 wt %.

4. The leaching method of scheelite according to claim 1, wherein a concentration of the sulfuric acid and the nitric acid in the step S1 are 98 wt % and 96-98 wt % respectively.

5. The leaching method of scheelite according to claim 1, wherein an inner wall of the reaction kettle in the step S1 is made of steel lined tetrafluoro material, a heating pipe and a temperature measuring device are installed in the reaction kettle, which are also made of steel lined tetrafluoro material.

6. The leaching method of scheelite according to claim 1, wherein a leaching temperature in the step S1 is 60-95° C., a leaching time in the step S1 is 1.5-6 h.

7. The leaching method of scheelite according to claim 1, wherein a concentration of the sulfuric acid in the step S2 is 98 wt %.

8. The leaching method of scheelite according to claim 1, wherein a reaction time in the step S2 is 25-35 min.

9. The leaching method of scheelite according to claim 2, wherein a concentration of the aqueous ammonia in the step S3 is 3-6 wt %.

10. The leaching method of scheelite according to claim 2, wherein a temperature of dissolving ammonia in the step S3 is room temperature and a time of dissolving ammonia in the step S3 is 1-2 h.

* * * * *